United States Patent [19]

Voss

[11] Patent Number: 5,022,265

[45] Date of Patent: Jun. 11, 1991

[54] METHOD AND APPARATUS FOR LEAK TESTING FLUID CONDUCTING FREEZE-DRYING APPARATUS

[75] Inventor: Günter Voss, Much, Fed. Rep. of Germany

[73] Assignee: Finn-Aqua, Hurth, Fed. Rep. of Germany

[21] Appl. No.: 496,526

[22] Filed: Mar. 20, 1990

Related U.S. Application Data

[63] Continuation of Ser. No. 175,800, Mar. 31, 1988, Pat. No. 4,918,975.

[30] Foreign Application Priority Data

Mar. 31, 1987 [EP] European Pat. Off. ........ 87104737.9

[51] Int. Cl.⁵ ............................................. G01M 3/22
[52] U.S. Cl. ..................................................... 73/40.7
[58] Field of Search .................... 73/40.7, 40.5

[56] References Cited

U.S. PATENT DOCUMENTS

| | | | |
|---|---|---|---|
| 2,504,530 | 4/1950 | Jacobs | 73/40.7 |
| 3,425,264 | 2/1969 | Frei | 73/40.7 X |
| 3,645,127 | 2/1972 | Mongodin et al. | 73/40.7 |
| 4,232,546 | 11/1980 | Dumont | 73/40.7 |
| 4,328,700 | 5/1982 | Fries | 73/40.7 |
| 4,419,882 | 12/1983 | Ishii et al. | 73/40.7 |
| 4,524,607 | 6/1985 | Pelletier et al. | 73/40.7 X |

*Primary Examiner*—Hezron E. Williams
*Assistant Examiner*—Joseph W. Roskos
*Attorney, Agent, or Firm*—Spencer & Frank

[57] ABSTRACT

A freeze-drying apparatus has a freeze-drying chamber, a double-walled product shelf disposed within the freeze-drying chamber, a conduit system partially disposed within the freeze-drying chamber and attached to the product shelf for temperature regulation thereof, a heat-exchange fluid contained in the conduit system, a test gas reservoir connected to the conduit system outside of the freeze-drying chamber, and a test gas specific detector connected to the chamber for detecting test gas introduced into the freeze-drying chamber from the heat-exchange fluid through a leak in the conduit system. In the alternative, the test gas reservoir is connected to the freeze-drying chamber, and a test gas specific detector is connected to the conduit system outside the freeze-drying chamber for detecting test gas introduced into the heat exchange fluid from the freeze-drying chamber through a leak in the conduit system.

10 Claims, 2 Drawing Sheets

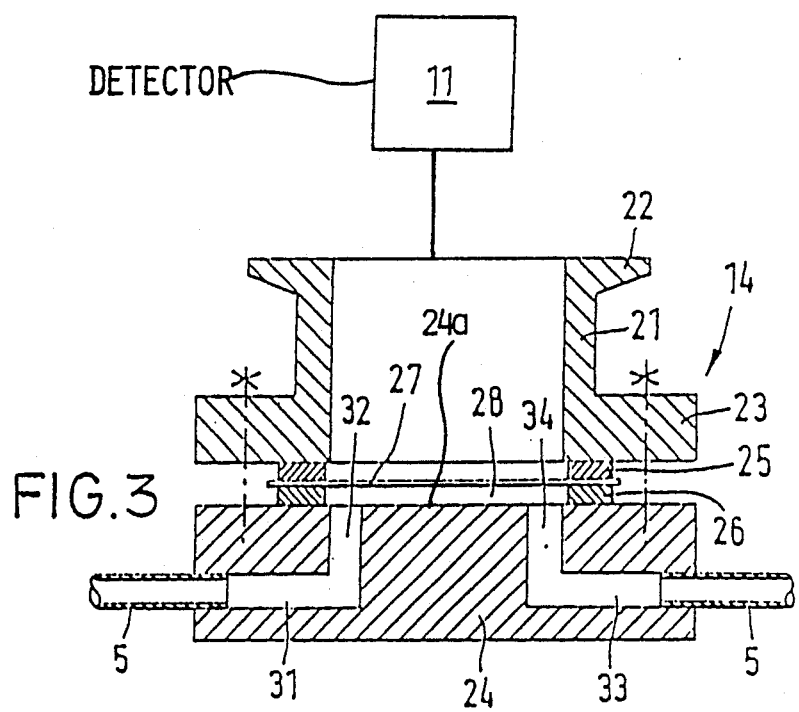
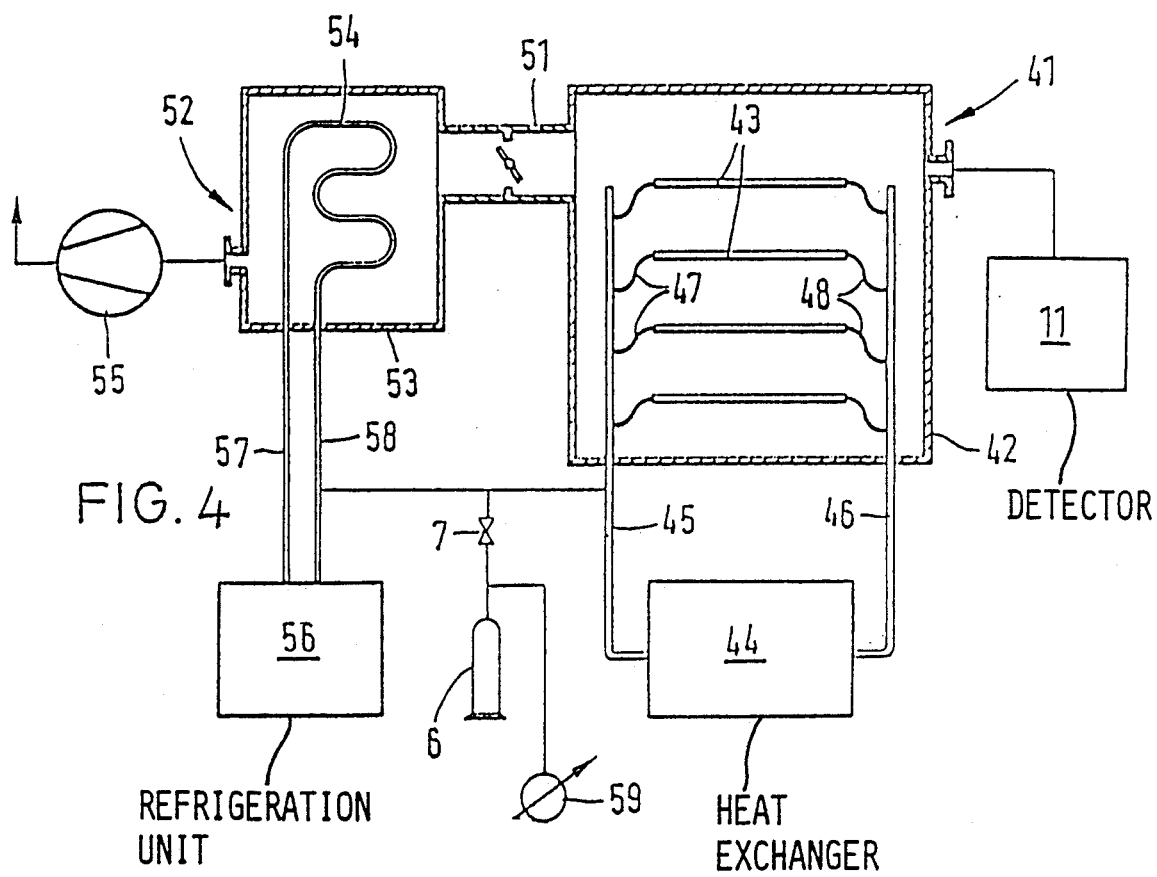

METHOD AND APPARATUS FOR LEAK TESTING FLUID CONDUCTING FREEZE-DRYING APPARATUS

CROSS REFERENCE TO RELATED APPLICATION

This is a continuation of application Ser. No. 07/175,800, filed Mar. 31, 1988, now U.S. Pat. No. 4,918,975 issued on Apr. 24, 1990.

BACKGROUND OF THE INVENTION

The present invention relates to a method for testing for leaks in freeze-drying systems and to freeze-drying apparatus for performing the method.

Freeze-drying apparatus usually includes a chamber equipped with product shelves for containers holding the product to be lyophilized. These product shelves are heatable because heat must be provided for the product to be lyophilized to accelerate the drying process. Frequently, such product shelves are also coolable allowing the freezing required in the freeze-drying process to take place within the chamber. Cooling and/or heating of the product shelves can be performed with the aid of liquids (brines, bases, silicone oil, or the like) or vapors. For this purpose, the product shelves are provided with flow channels or double walls. The product shelves are supplied with the heat-exchange medium by way of conduits connected to the product shelves brought through the walls of the freeze-drying chamber.

The freeze-drying process is performed under a vacuum. Therefore, devices for producing a vacuum and for dissipating the vapors developed during the drying are connected to the freeze-drying chamber. Generally, a second chamber accommodating a condenser is connected to the freeze-drying chamber and is coupled to a vacuum pump.

Freeze-drying processes are preferentially employed in the manufacture of medicinal preparations. The value of a charge is frequently very high: it is often in excess of one million dollars. The protection of such a charge against contamination which could occur, for example, due to leaks in the conduit system for the heating and/or cooling medium is therefore of particular significance.

German Offenlegungsschrift (nonexamined published application) 3,230,146 discloses the testing of closed pipeline systems for leaks in that the tightly closed system is pressurized with a fluid, pressure is maintained over a longer period of time and this pressure is monitored by means of a measuring instrument. The tested system is tight if no drop in pressure occurs.

Leak detection of this type is relatively insensitive. Moreover, the systems to be monitored in this manner must be designed so that they are able to withstand a relatively high testing pressure. Finally, it is generally impossible to continuously monitor the pipeline system for leaks while it is in operation because it would require constant maintenance of the test pressure.

SUMMARY OF THE INVENTION

It is an object of the present invention to provide a leak testing method for fluid-conducting systems in freeze-drying apparatus which is highly sensitive and can be performed continuously in a simple manner.

This is accomplished according to the present invention by a test gas introduced into the cooling and/or heating medium and any escape of test gas through a leak existing in the fluid-conducting system within the freeze-drying chamber is detected with the aid of a detector which is sensitive to the test gas and which is connected to the freeze-drying chamber.

Another embodiment of the method of the present invention is to maintain a test gas atmosphere in the freeze-drying chamber during freezing and/or during the freeze-drying process. Any test gas entering into the medium from a leak in the conduit system within the freeze-drying chamber is monitored by a test gas sensitive detector connected to the conduit system.

Both methods make it possible to constantly monitor for leaks the regions of the conduit systems which are relevant to product safety in a relatively simple manner. Particularly if helium is used as the test gas, this leak testing method is highly sensitive. Helium can penetrate through leaks which are too small for the liquids or vapors in the conduit systems due to their surface tension. The method according to the invention thus makes it possible to detect existing or developing leaks at a sufficiently early stage, before the fluids escape and cause contamination.

BRIEF DESCRIPTION OF THE DRAWINGS

FIG. 3 is a sectional elevational view of a membrane separator used in the second preferred embodiment.

FIG. 4 is a schematic view of a freeze-drying system utilizing the first preferred embodiment.

DESCRIPTION OF THE PREFERRED EMBODIMENTS

Figure 1:
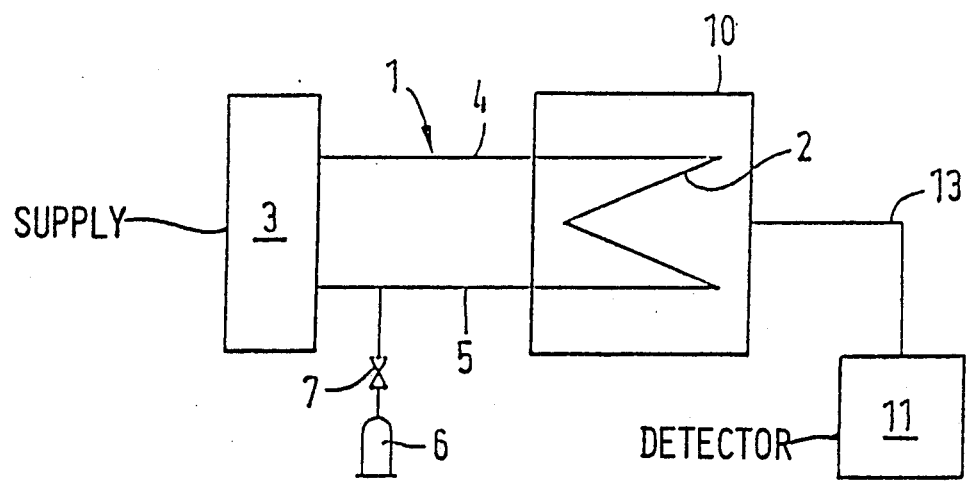
FIG. 1 is a schematic view of a first preferred embodiment according to the present invention.
Figure 2:
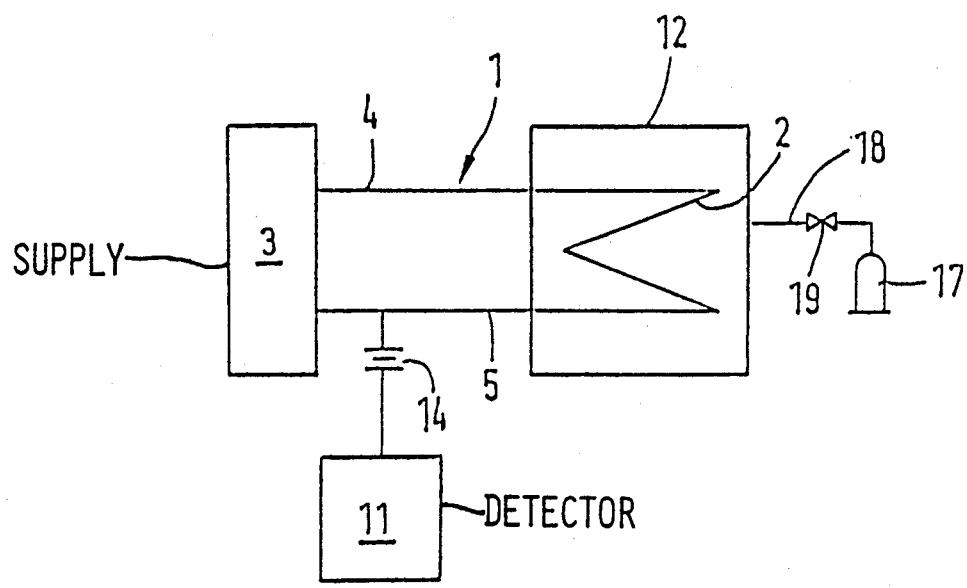
FIG. 2 is a schematic view of a second preferred embodiment according to the present invention.

Turning generally to FIGS. 1 and 2 which are intended to explain the principle of the invention, the pipe system 1 for circulating a liquid or vapor includes a coiled pipe 2, a supply device 3 (for example a refrigeration machine in a circulating cooling system) and connecting conduits 4 and 5. Coiled pipe 2 corresponds, for example, to the conduit system disposed within the chamber of a freeze-drying apparatus.

In the embodiment of FIG. 1, a test gas reservoir, such as a compressed gas cylinder 6 is connected by a valve 7 to the connecting conduit 5. If the valve 7 is open, test gas, preferably helium, passes into the fluid in the pipe system 1 and dissolves therein. If the conduit system 1 has a leak, helium escapes even if the leak is so small that, due to the surface tension of the fluid, the liquid or vapor itself does not escape. That part of the pipeline system 1 which is to be monitored (in this case coiled pipe 2), is disposed within a closed area, such as a chamber 10. A leak detector such as a test gas specific detector 11 is connected to the chamber 10 by a conduit 13. By means of such an arrangement the coiled pipe may be continuously monitored for leaks.

If helium is used as the test gas, the test gas detector 11 is preferably a mass spectrometer which may be a component of a leak detection device which includes further supply devices (for example, vacuum pump, cooling trap, valves and the like).

The valve 7 is preferably a pressure reduction valve which, on the one hand, prevents the pipe system 1 from being charged with the full pressure of the cylinder 6 and, on the other hand, makes it possible to monitor the presence of test gas in the reservoir 6 by means of an appropriate pressure measuring device. It is not necessary to keep the valve 7 constantly open for constant monitoring; it has to be ensured, however, that a sufficient quantity of test gas is dissolved in the fluid of the pipe system. As long as the pipe system is tight, the dissolved test gas remains in this fluid.

In the embodiment according to FIG. 2, the leak detector 11 is connected to the pipe system 1 by a membrane separator 14. In contrast to the embodiment of FIG. 1, it is not the escape of test gas through a possibly existing leak that is monitored but the entrance of test gas through the leak into the fluid. For this purpose, the regions of the pipeline system 1 to be checked for leaks are bathed in test gas introduced from a pressure vessel 17 through a conduit 18 and a valve 19 into a chamber 12 which encloses the coiled pipe 2.

FIG. 3 shows a cross-sectional view of an embodiment of a membrane separator 14 connecting a test gas specific detector 11 to the pipe system 1 as shown in FIG. 2. The membrane separator 14 is composed of a conduit section 21 provided at its frontal ends with flanges 22 and 23. The test gas specific detector 11 is connected to the flange 22.

A conduit element 24 is connected to the conduit 5 of the pipe system. The flange 23 of the conduit section 21 is screwed onto a top face 24a of the conduit element 24. Two rings 25 and 26, preferably made of copper, which enclose between them a membrane 27, are disposed between the flange 23 and the conduit element 24. Thus, a chamber 28 is produced between the top face 24a of the element 24 and the membrane 27. The sections of the pipeline 5 ending in the conduit element 24 continue in bores 31, 32 and 33, 34, respectively, which each open into the chamber 28. Thus, the fluid flowing through the conduit 5 is conducted through the chamber 28 approximately parallel to the membrane 27.

The membrane 27 is permeable for the selected test gas but practically impermeable for the liquid flowing through the pipeline 5. If helium is used as the test gas, the membrane is preferably a sheet of fluorinated ethylene propylene resin (FEP) carbontetrafluoride of about 1/10 mm thick. Any helium dissolved in the liquid flowing through the pipeline 5 is able to pass through the membrane 27 and is detected by the connected test ga detector 11 without the latter being endangered by the fluid.

FIG. 4 shows a freeze-drying apparatus in which the embodiment of the invention described in connection with FIG. 1 is employed. The freeze-drying apparatus 41 is composed of a chamber 42 in which product shelves 43 are installed for containers holding the product to be lyophilized. The product shelves 43 in a freeze-drying apparatus of this type are customarily heatable because heat must be provided to the product to be lyophilized to accelerate the process. Frequently, such product shelves 43 are also coolable so that the freezing required in the freeze-drying process can also take place within the chamber 42.

The temperature adjustment of the product shelves 43, which are double-walled constructions, is effected with the aid of a heat exchange device 44. Two conduits 45 and 46 extend from the device 44 into the freeze-drying chamber 42. The product shelves 43 are connected parallel to one another to the conduits 45 and 46 by flexible conduits 47 and 48 so that the fluid serving as the heat-transporting agent (for example, a silicone oil or a brine) circulates through the pipeline system composed of the product shelves 43, the heat exchange device 44 and the conduits 45, 46.

An evacuation device 52 is connected to the freeze-drying chamber 42 by way of a pipeline 51. The evacuation device includes a vacuum pump 55 connected to a condenser chamber 53 and the cooled coiled pipe system 54 disposed in the condenser chamber 53. A refrigeration machine 56 connected by conduits 57 and 58 with the coiled pipe system 54 serves to supply the coiled pipe 54 in the condenser chamber 53.

To be able to constantly monitor those parts of the fluid system which may become a source of contamination in the case of a leak, the following measures are taken: the conduits 45 and 58 are connected by a valve 7 to a test gas reservoir 6, preferably a container of pressurized helium. To monitor the supply of test gas, a pressure measuring gauge 59 is provided. In this manner helium is introduced into the conduits 45 and 58 and the helium is dissolved in the fluids present in the conduit systems. The freeze-drying chamber 42 is further connected to the test gas sensitive detector 11. If a leak occurs in the critical regions of the conduit systems, that is, within the chamber 12 or within the condenser 53, helium will escape and reach the test gas specific detector 11.

As described in connection with the embodiment according to FIG. 2, it is also possible to connect the test gas detector 11 to the conduit systems of the freeze-drying apparatus and condenser by way of membrane separators 14. This requires that the freeze-drying process takes place in a test gas atmosphere.

The significant advantage of the present invention is that sensitive helium leak detection is possible, on line if desired, in systems filled with fluids. If one assumes that the quantity of helium dissolved in the liquid is large compared to the throughput of helium through the membrane separator 14, then the dissolved helium concentration can be determined in a quasi-equilibrium. The significant factor is that the medium constantly flows over the membrane 27 so that no test gas or helium derichment occurs. The magnitude of the leak can be calculated from the physical parameters of the liquid (for example, solubility, temperature and the like) and of membrane 27.

Depending on which leak detection method is employed, a sensitivity of approximately $10^{-9}$ mbar 1/s can be realized. The decisive factor is the concentration of helium present in the respective fluids. The greatest sensitivity can be realized with the method in which a helium reservoir is connected to the liquid system so that helium is dissolved in this liquid to saturation. Generally liquids cannot escape through leaks of the order of magnitude that usually occur in this environment and thus, such leaks can be detected in liquid systems before the liquid itself can escape.

The ability of performing constant leak detection during the normal operation of freeze-drying apparatus saves maintenance time, increases the availability of the systems and may save time and expense in the case of malfunction. Some leaks (for example, cold leaks, leaks under pressure conditions) can often not be detected with conventional methods in the "dry" state of the apparatus. The method of the present invention makes it possible to detect such leaks even during operation.

It will be understood that the above description of the present invention is susceptible to various modifications, changes and adaptations, and the same are intended to be comprehended within the meaning and range of equivalents of the appended claims.

What is claimed is:

1. A freeze-drying apparatus comprising a freeze-drying chamber, a double-walled product shelf disposed within the freeze-drying chamber, a conduit system partially disposed within the freeze-drying chamber and attached to the product shelf for temperature regulation thereof, a heat-exchange fluid contained in the conduit system, a test gas reservoir connected to the conduit system outside of the freeze-drying chamber, and a test gas specific detector connected to the chamber for detecting test gas introduced into the freeze-drying chamber from the heat-exchange fluid through a leak in the conduit system.

2. A freeze-drying apparatus as defined in claim 1, further comprising a condenser chamber connected to the freeze-drying chamber, an additional conduit system disposed within the condenser chamber and being connected to the test gas reservoir, and a heat-exchange fluid contained within the additional conduit system.

3. A freeze-drying apparatus as defined in claim 1, further comprising a pressure reduction valve connecting the test gas reservoir to the conduit system.

4. A freeze-drying apparatus as defined in claim 1, wherein the test gas detector is a mass spectrometer.

5. A freeze-drying apparatus as defined in claim 1, wherein the test gas reservoir is a helium reservoir.

6. A freeze-drying apparatus comprising a freeze-drying chamber, a double-walled product shelf disposed within the freeze-drying chamber, a conduit system partially disposed within the freeze-drying chamber and attached to the product shelf for temperature regulation thereof, a heat-exchange fluid contained in the conduit system, a test gas reservoir connected to the freeze-drying chamber, and a test gas specific detector connected to the conduit system outside the freeze-drying chamber for detecting test gas introduced into the heat exchange fluid from the freeze-drying chamber through a leak in the conduit system.

7. A freeze-drying apparatus as defined in claim 6, wherein the test gas detector is connected to the conduit system with a membrane gas separator comprised of a test gas permeable membrane and the test gas permeable membrane contacting the heat-exchange fluid.

8. A freeze-drying apparatus as defined in claim 6, wherein the test gas detector is a mass spectrometer.

9. A freeze-drying apparatus as defined in claim 6, wherein the test gas reservoir is a helium reservoir.

10. A method for detecting leaks in a fluid-conducting conduit system of a freeze-drying apparatus having a freeze-drying chamber accommodating a part of the conduit system, and a heat exchange fluid in the conduit system, comprising the steps of:

maintaining a helium atmosphere in the freeze-drying chamber;

separating helium from the heat exchange fluid with a separator including a membrane pervious to helium attached to the conduit system; and monitoring the presence of helium in the heat exchange fluid with the aid of a helium-sensitive detector connected to the separator.

* * * * *